Figure 1:
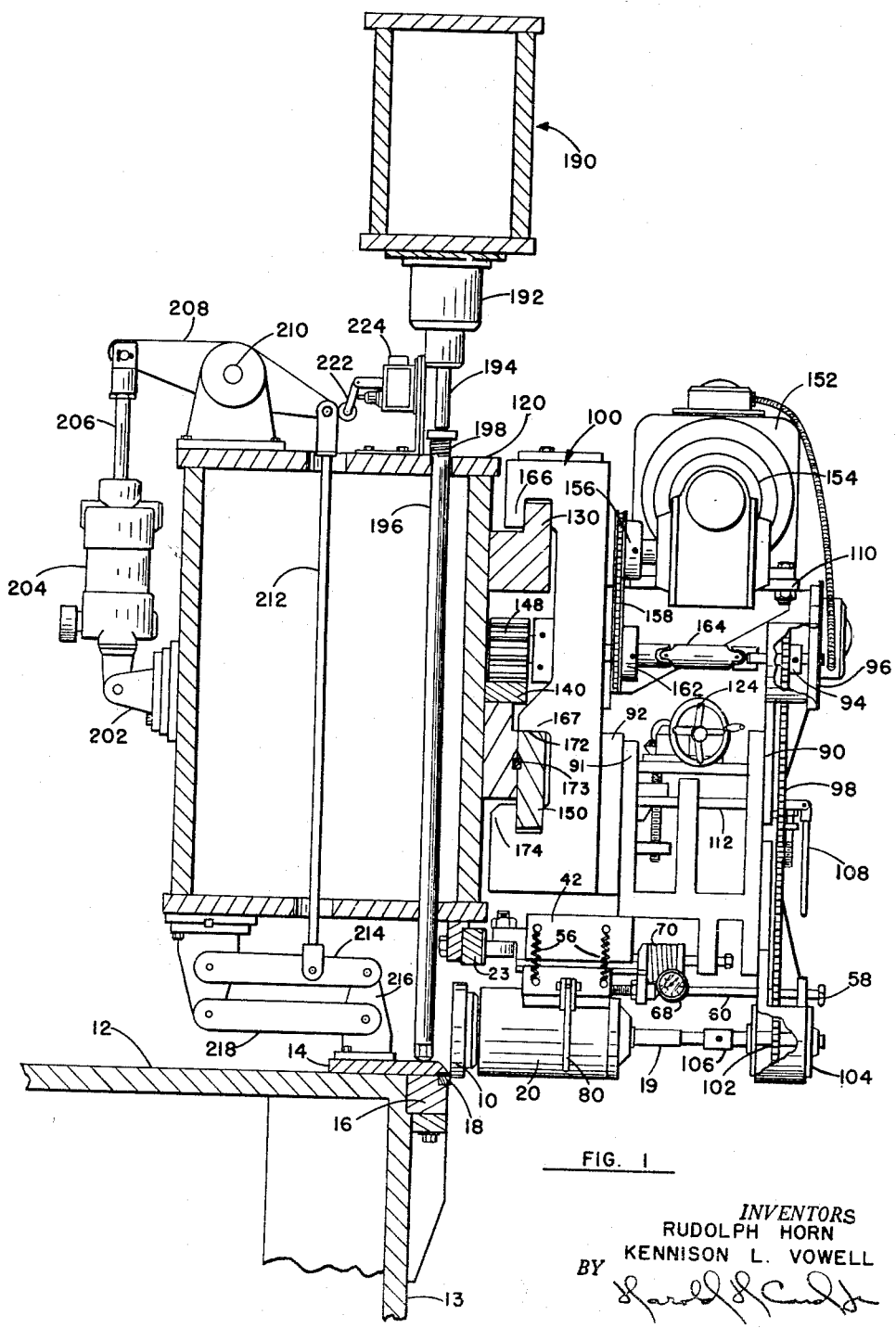

Feb. 11, 1964

R. HORN ETAL 3,120,915

EDGE PREPARATION MACHINE AND METHOD

Filed June 20, 1960

7 Sheets-Sheet 1

INVENTORS
RUDOLPH HORN
KENNISON L. VOWELL
BY

ATTORNEY

INVENTORS
RUDOLPH HORN
KENNISON L. VOWELL

ATTORNEY

Feb. 11, 1964  R. HORN ETAL  3,120,915
EDGE PREPARATION MACHINE AND METHOD
Filed June 20, 1960  7 Sheets-Sheet 3

INVENTORS
RUDOLPH HORN
KENNISON L. VOWELL
BY
ATTORNEY

Feb. 11, 1964    R. HORN ETAL    3,120,915
EDGE PREPARATION MACHINE AND METHOD
Filed June 20, 1960    7 Sheets-Sheet 4

INVENTORS
RUDOLPH HORN
KENNISON L. VOWELL
BY

ATTORNEY

Feb. 11, 1964 R. HORN ETAL 3,120,915
EDGE PREPARATION MACHINE AND METHOD
Filed June 20, 1960 7 Sheets-Sheet 5

INVENTORS
KENNISON L. VOWELL
RUDOLPH HORN
BY
ATTORNEY

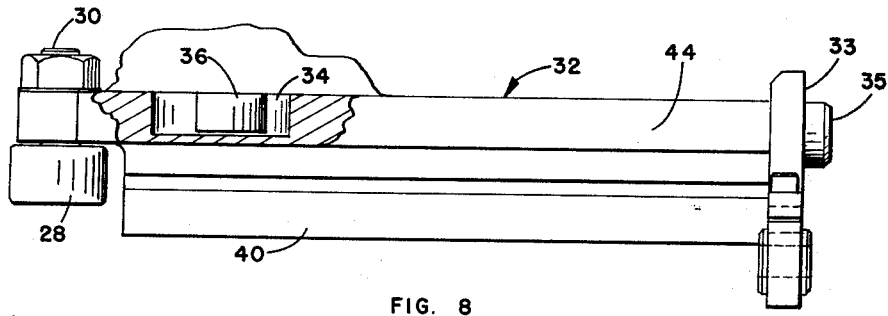
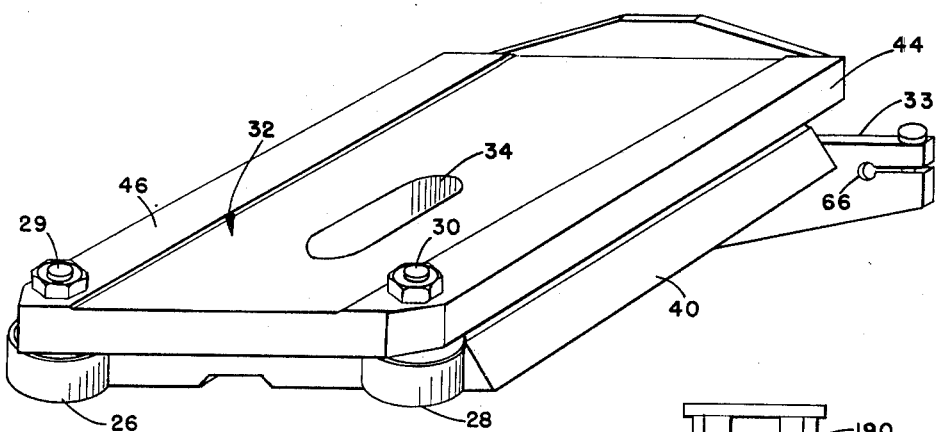
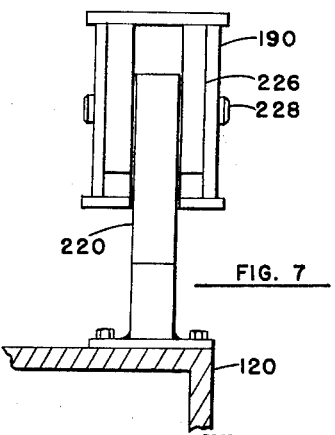
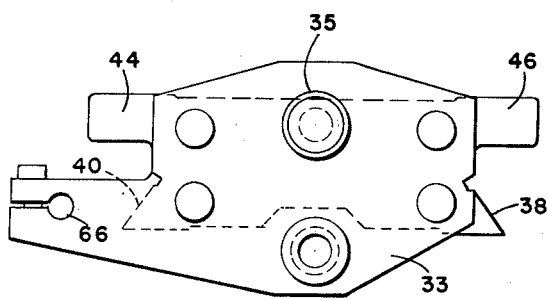

INVENTORS
RUDOLPH HORN
KENNISON L. VOWELL
BY
ATTORNEY 3,120,915
EDGE PREPARATION MACHINE AND METHOD
Rudolph Horn and Kennison L. Vowell, Los Angeles,
Calif., assignors to North American Aviation, Inc.
Filed June 20, 1960, Ser. No. 37,146
23 Claims. (Cl. 225—1)

This invention concerns method and apparatus for trimming an object to produce an edge or a surface of extremely precise form and accurate dimension. More particularly, the invention contemplates an improved method and means for trimming an edge on thin members in sheet form to provide a perfectly straight edge free of bends, burrs, or rounded corners.

The invention disclosed herein is applicable to the trimming of any article which can be held between clamps while a portion thereof is severed from the article to provide a sharp, cleanly cut and dimensionally accurate edge regardless of the precise composition or dimensions of such article. However, a particular need for this invention arose in connection with the trimming of relatively thin sheets of advanced alloy material during fabrication of ultra high speed type aerial vehicles, wherein the techniques and materials formerly employed for conventional supersonic aircraft and missiles are often unsatisfactory. Structure used in vehicles of the stated type must be capable of withstanding the extreme temperatures and stresses encountered during operation of the vehicle. As a specific example, thin sheet metal skin surfaces such as formerly used in aircraft construction are totally inadequate, and reinforced skin surfaces of honeycomb sandwich panel type are necessary. In the manufacture of such panels, thick slabs of honeycomb core material of thin metal foil are accurately cut to produce uniform thickness throughout the section, and are thereafter oven brazed to sheet metal top and bottom panel surfaces. Materials of construction formerly in wide use are largely unsuitable in vehicles of the stated type, and have of necessity been discarded in favor of advanced type alloys of increased hardness and strength, with consequent decrease in machinability, requiring specialized fabrication techniques.

Fabrication of honeycomb sandwich panels in sections of the type referred to above involves the use of relatively huge expanses of thin sheet metal as little as .006 inch thick for the top and bottom panel surfaces. Due to inherent limitations in the rolling process used for manufacture of advanced type alloy sheets, the maximum width obtainable in a sheet .006 inch thick is sixteen feet. Therefore, it is necessary to use a plurality of the stated sheets, joined together along their adjacent edges, to form top and bottom surfaces in the panels described above. Welding is the most acceptable method of joinder between such sheets, based upon consideration of factors such as cost, overall strength, and economy of weight for welding as against various alternative fastening means.

However, welding of material in extremely thin sheet form along edges of the length involved in the problem situation stated above requires specialized techniques not heretofore known in the welding art. In all known methods of fusion welding, the welding temperature is often much higher than the melting point of the base metal, and some of this heat permeates the base metal surrounding the weld area. Thermal changes such as expansion and contraction are virtually unavoidable, as well as changes in physical characteristics such as strength and ductility. Moreover, metallurgical effects such as crystallization and heat treatment occur due to the application of welding heat.

These effects are particularly severe in the case of joining two light metallic members to each other, partly due to the high rate of thermal conductivity in thin metallic sections and partly due to the relatively low masses of metal involved. Where the mass of metal in two parts joined by welding is insufficient to absorb safely the welding heat within the time required to effect fusion of the materials, such as in the case of extremely thin metal sections, the welding problem is especially acute due to the exaggerated effect of residual and heat stresses resulting from the welding operation. Residual stress results from the rapid and uneven cooling of molten metal in the area of the weld, and from phase transformation of the granular structure in the base metal beyond the area of the weld. Residual and heat stresses have a highly deleterious effect upon the strength of the welded article, and produce severe distortion in the case of thin walled members.

In welding thin metallic sections by use of methods heretofore known, the stress and distortion effects described above are unavoidable and acute. Strong, clean and accurate welded joints have been heretofore unobtainable in welding thin walled metallic sections such as encountered in the problem situation described herein. Therefore, known techniques of fabrication are unacceptable, since accurate fitting of welded components in vehicles of the stated class is essential, especially where large sections must be joined together along continuous high-strength weld seams, and avoidance of the slightest distortion and resulting misalignment are commensurately important. Such distortion is further unacceptable in view of the extremely close tolerances required for joinder of the welded sheets to honeycomb core material, wherein a maximum clearance for brazing between the core and the sheet is on the order of .0010 inch throughout the entire area of the stated panel.

The most expedient method for effecting a satisfactory weld of the type involved in the problem situation discussed above requires the formation of an upturned flange or lip along one or both of the edges to be joined, and the accurate alignment of both edges closely adjacent each other throughout their entire length. The metal sheets are positioned in a special welding machine in the stated relationship. Thereafter, precision welding is accomplished by a high temperature welding head which moves rapidly along an automatically controlled path of travel and burns through the upturned flange or flanges to produce a weld puddle which fuses the two adjoining edges together in a single pass. Thus, a minimum of weld heat is absorbed by the base metal, and the amount of distortion resulting thereform is commensurately diminished.

In accomplishing the highly specialized welding process referred to above, careful preparation of the edges to be thus joined is critically important. For example, any waves or dents along either edge would vary the clearance between the welding head and the precise area to which welding heat is applied. Variations in the stated clearance would produce non-uniform intensity and distribution of heat, each of which affects the strength of the completed weld joint, the cooling rate throughout the area of the weld, and the size of the weld area, all of which in turn produce distortion which cannot be remedied by mere rolling, heat treating or any known means without considerable weakening of the weld seam. Similarly, gaps between the adjacent edges of the sheets before welding would have cumulative effects on the condition of the weld equally as deleterious as those resulting from waves or dents.

Avoidance of the several effects mentioned above requires particular attention to the condition of the edges to be welded. Each of the edges must be absolutely straight, perfectly flat, squarely cut and free of waves, bends, burrs and dents. Since the rough trimming operation performed during manufacture of sheet metal such as that described hereinabove does not produce the necessary dimensional accuracy for precision welding in the manner stated, the sheets require special cutting prior to the welding operation.

In the prior art, edge trimming or contour cutting of sheet metal is normally accomplished by so-called slitting devices comprising two rotating wheels with their blade edges overlapping in the manner of a household can opener. In devices of this type, the cutting wheels both rotate but are otherwise stationary and the material to be cut is moved translationally through the rotating cutters. Use of such devices entails the application of force on the material to steer the same through the cutting wheels, to produce a relative path of travel which will result in the desired shape of cut. Since sheet metal of .006 inch thickness and 16 feet width cannot even be lifted in the unrolled condition without causing canning or angular deformations which produce permanent dents or dings at their apices, material of this type cannot be steered through any device requiring tugging or pushing of the material, hence conventional slitters are unsuitable for trimming such sheets. Moreover, slitters of the type mentioned above cannot make perfectly straight cuts through material which is tapered in thickness, due to variation in the lateral force exerted on the material by the cutting action of the wheel blades.

Due to the sensitive nature of metal in foil or thin sheet form, and the handling problems incident thereto, it is a basic requirement in trimming edges of such material that the device which accomplishes the trimming must permit accurate cutting along a predetermined path without necessitating movement of the material by the application of force thereon.

Also, since it is a vital consideration in the problem statement set forth above that the trimmed edge be perfectly straight regardless of the hardness of the material being trimmed, or variations in its thickness, it is a further requirement that the device which accomplishes the trimming incorporate means preventing displacement of the material by variations in the force exerted on the material by the cutter during its movement along a predetermined straight path.

Moreover, due to the need for extreme accuracy in providing a perfectly square edge as necessary for welding in the manner described above, it is a further requirement in any device used for the purpose here involved that means be provided to remove metal so that the resulting edge is free of burrs, bends, waves and rounded portions.

In addition, since the problem statement described above includes use of material of tapered or otherwise non-uniform thickness for use in the fabrication of structures in which load stresses are not uniform, it is a further requirement in the device for trimming such material that means be incorporated for adjusting the device to produce precision cutting of edges regardless of such variations in thickness.

Also, since the amount required to be severed from a sheet of material in order to produce a perfectly straight edge may vary considerably along the entire width of such sheets, the device for trimming such sheets is required to sever accurately any amount from the edge which may vary from a thin sliver to a relatively wide strip.

Accordingly, it is a principal object of the instant invention to provide apparatus for trimming material with improved accuracy by severing a portion therefrom along a precise predetermined cutting path.

It is a further object of this invention to provide apparatus as set forth in these objects incorporating means by which extremely accurate trimming may be accomplished without necessitating movement of the material being trimmed.

Also, it is an additional object of the invention disclosed herein to provide apparatus for trimming with improved accuracy material of tapered or otherwise non-uniform thickness.

It is a further object of the instant invention to provide apparatus for trimming material with improved accuracy by severing a portion therefrom so that the resulting edge is squarely cut and free of burrs, bends, waves and rounded portions.

It is an additional object of this invention to provide apparatus for trimming material with improved accuracy including means permitting precise adjustment of the apparatus to accommodate materials of different thickness or hardness, or different conditions of the trimmed edge.

It is also an object of the invention herein disclosed to provide apparatus for trimming material with improved accuracy by severing a portion therefrom along a precise predetermined cutting path so that the severed portion may vary in width from .005 inch to several feet.

Figure 2:
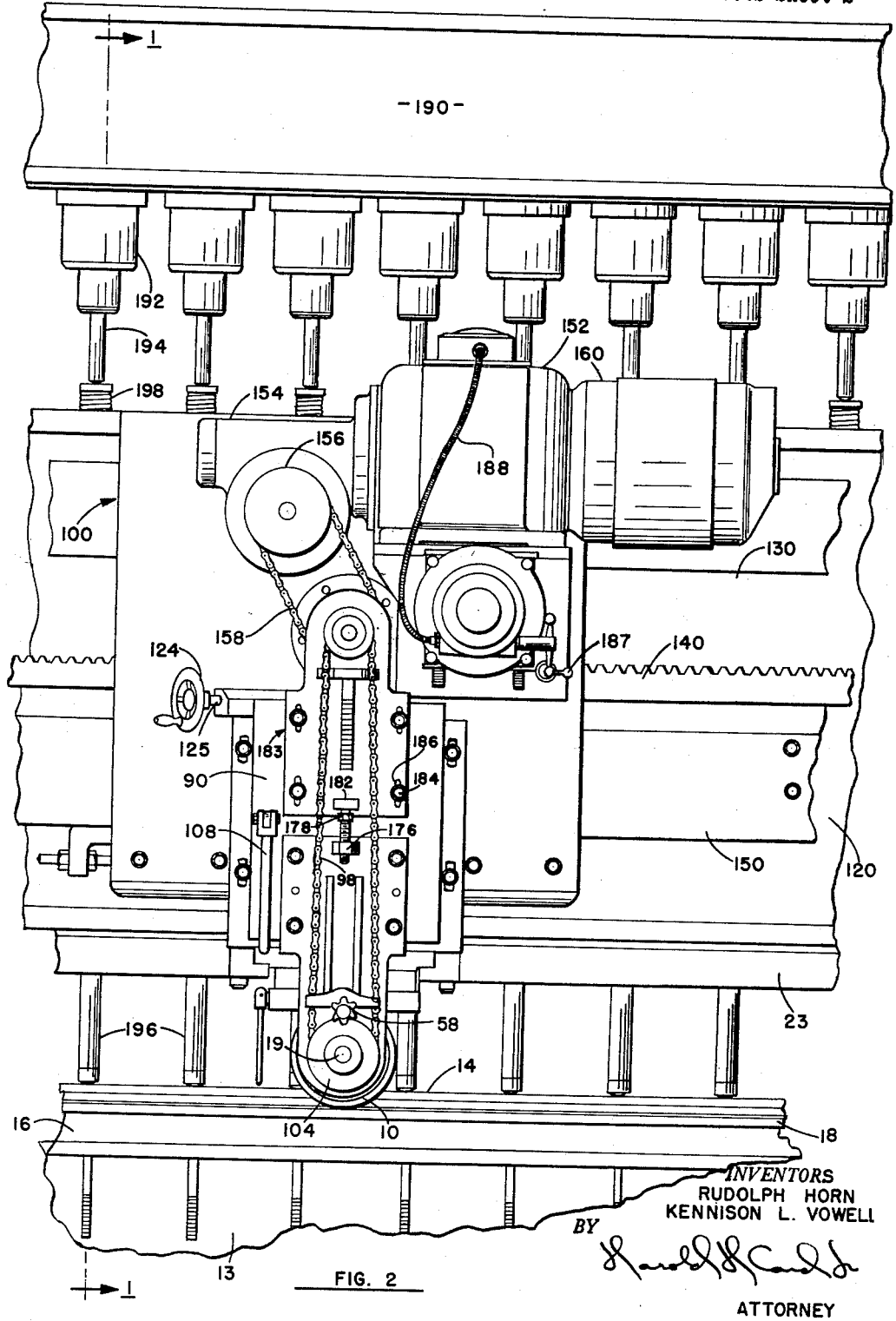
Figure 3:
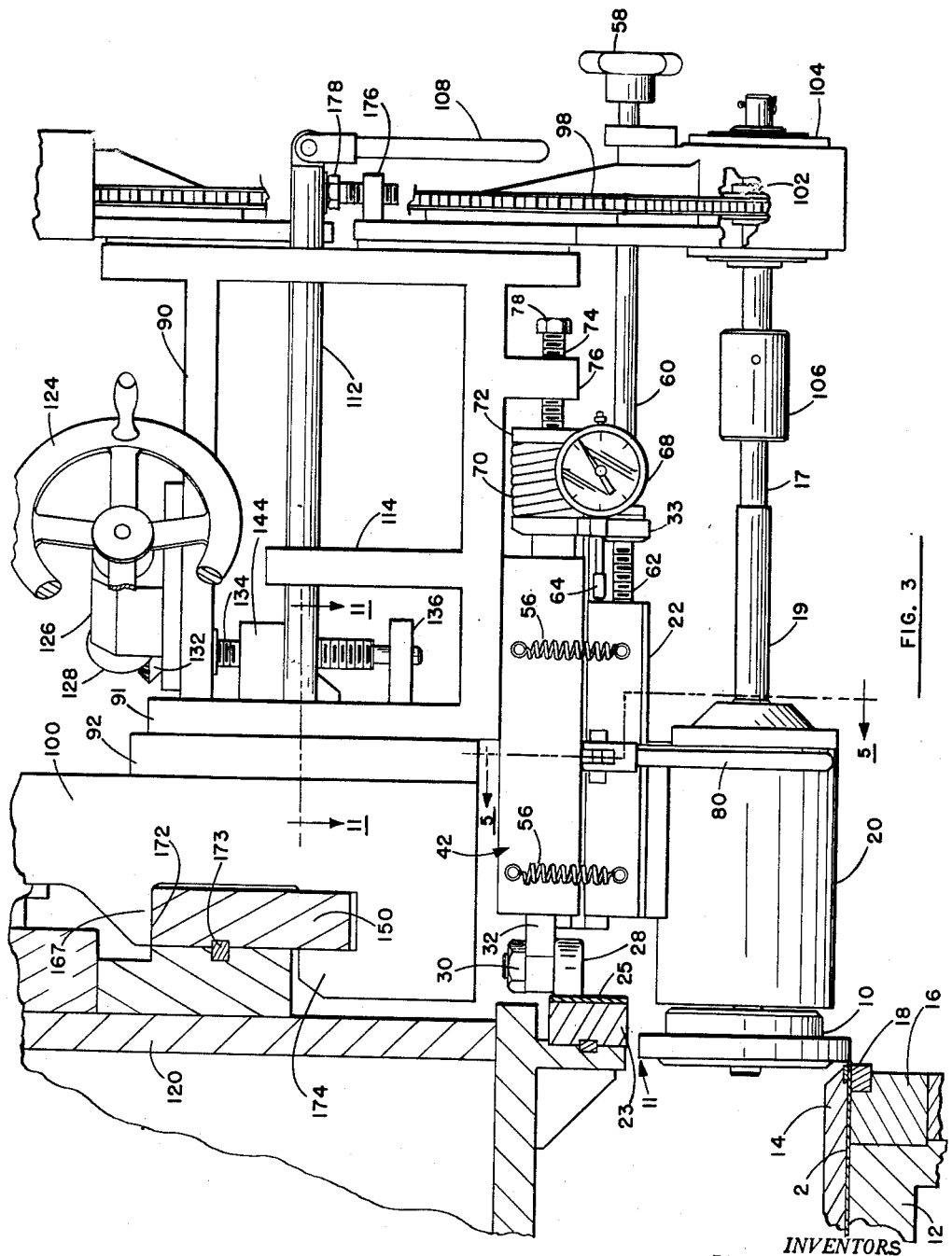
Figure 4:
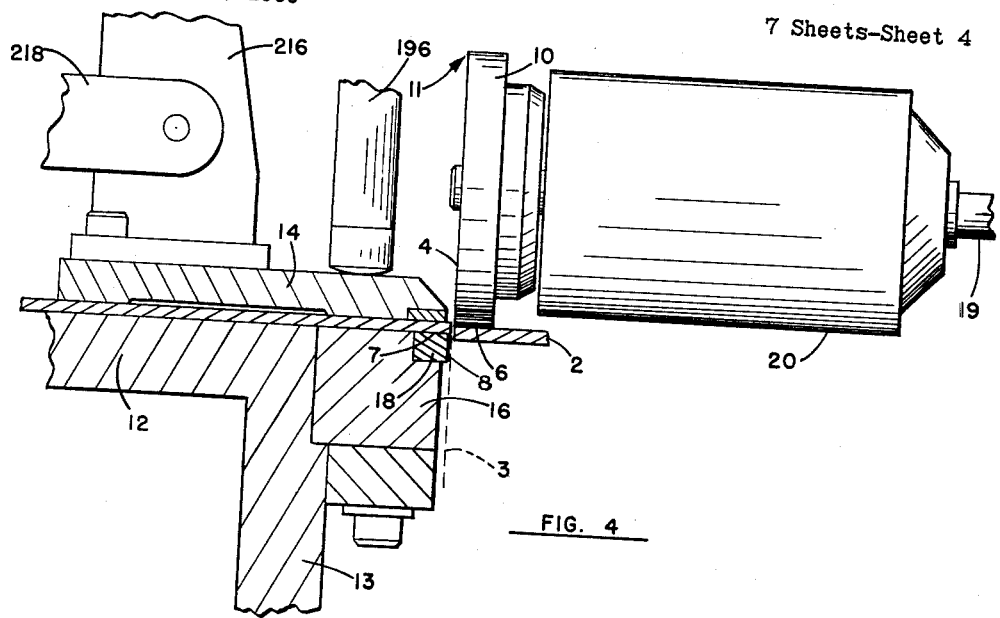
Figure 15:
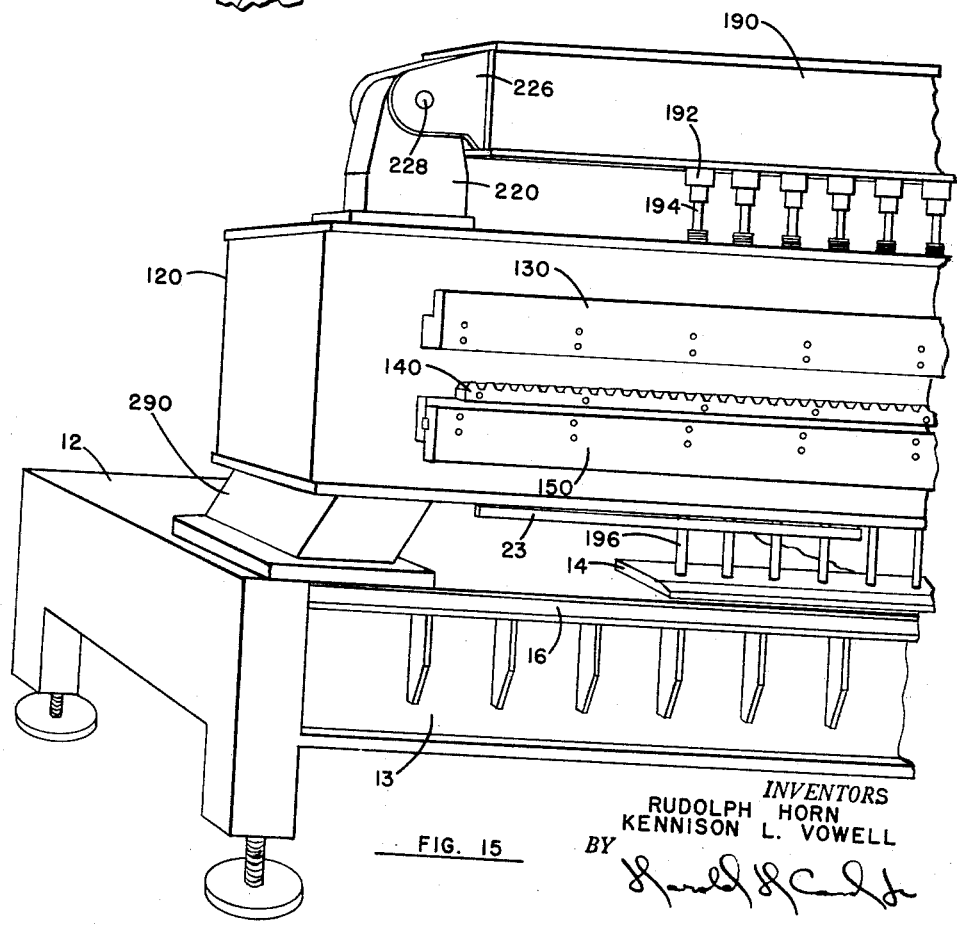
Figure 6:
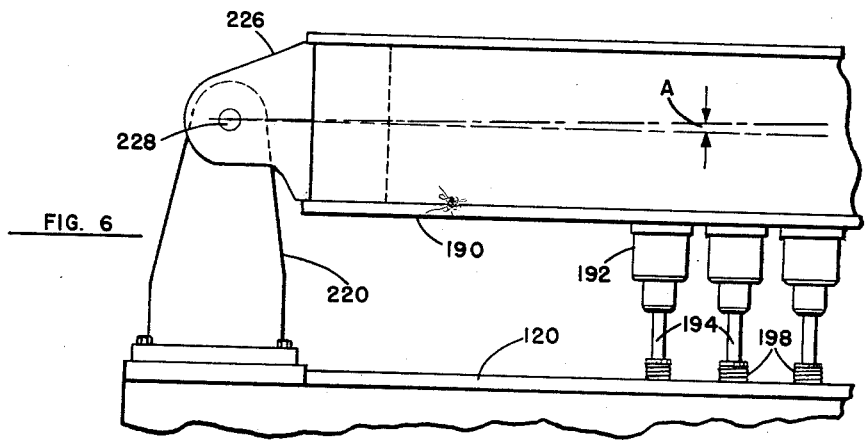
Figure 5:
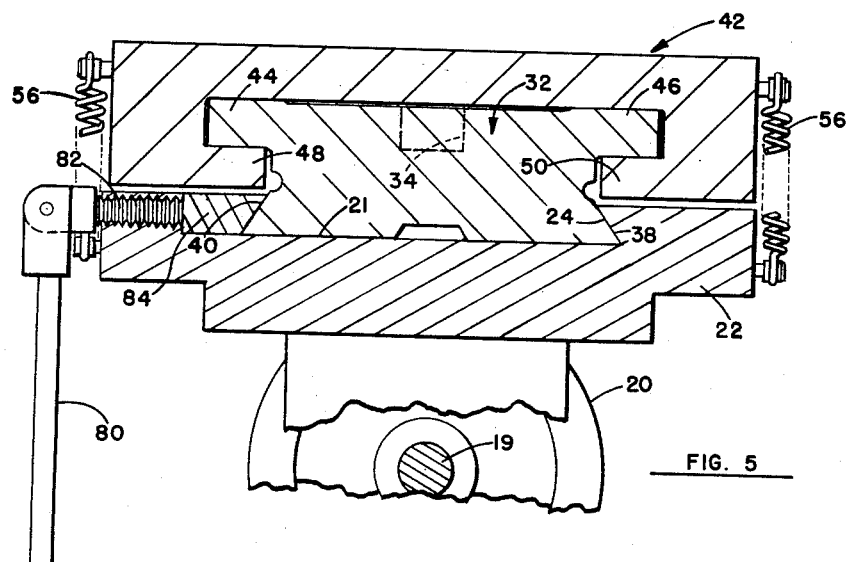
Figure 14:
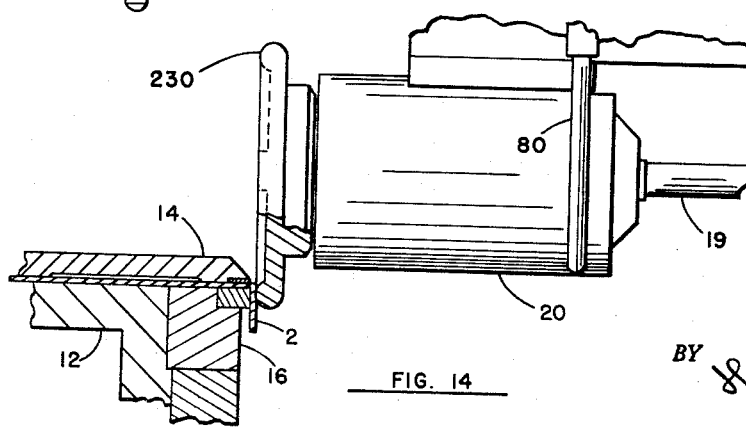
Figure 11:
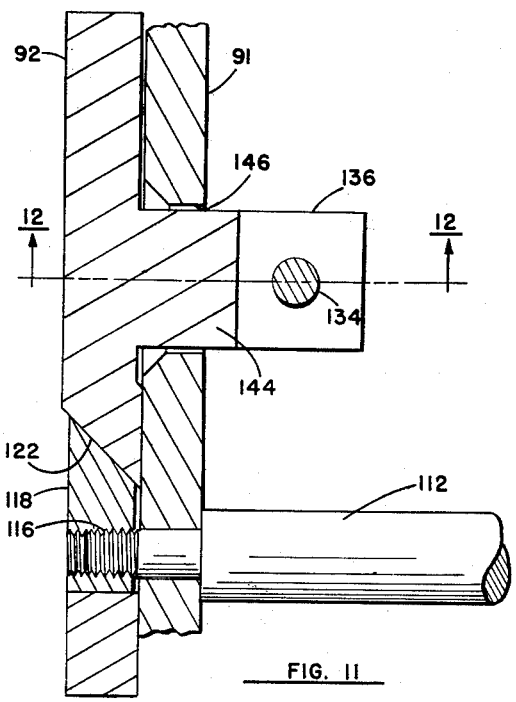
Figure 12:
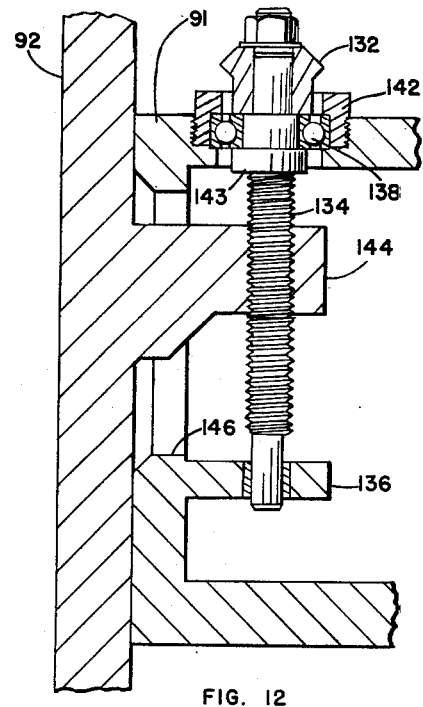
Figure 13:
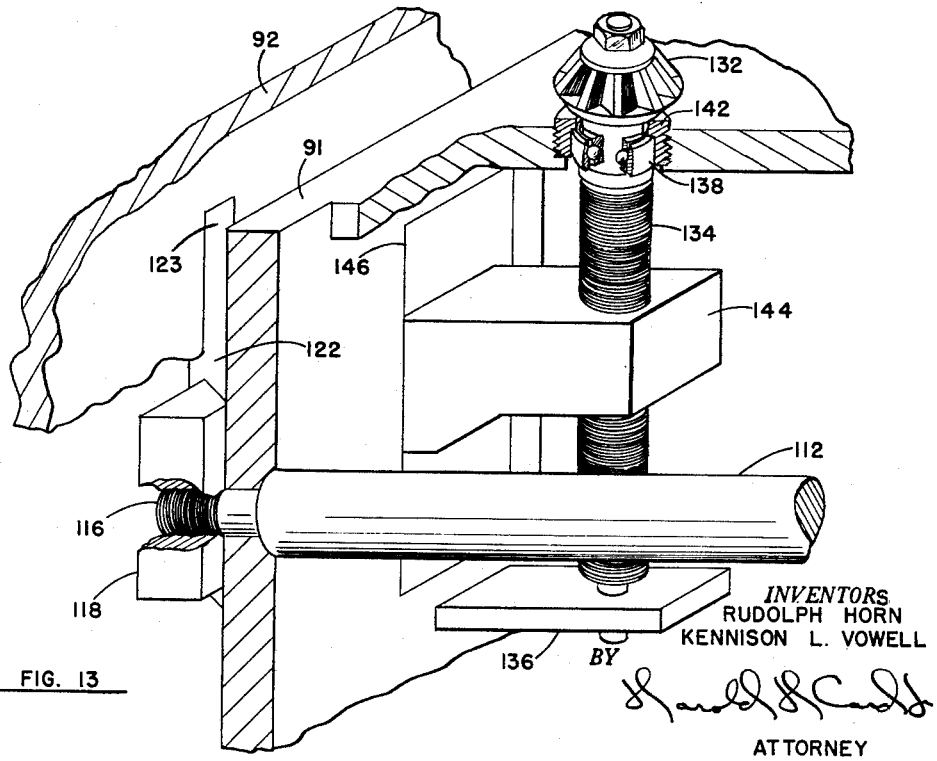

Other objects and advantages will become apparent upon a close reading of the following detailed description of an illustrative embodiment of the inventive concept, reference being had to the accompanying drawings, wherein:

FIGURE 1 shows, in side elevation and partly in section, a general view of the apparatus disclosed herein, FIGURE 2 shows a front elevation of the apparatus of FIGURE 1, FIGURE 3 shows a side elevation partly in section of a portion of the apparatus of FIGURE 1 in slightly larger detail, FIGURE 4 shows an enlarged side elevation of a portion of the apparatus of FIGURE 1, FIGURE 5 shows a cross-sectional view taken along line 5—5 of FIGURE 3, FIGURE 6 shows a front elevation of one end of the reaction stress box beam shown in cross-section at the top of FIGURE 1, FIGURE 7 shows an end view in elevation of the box beam mount of FIGURE 6, FIGURE 8 shows in side elevation and partial section a portion of internal structure of the apparatus of FIGURE 3 in larger detail, FIGURE 9 shows a perspective view of the structure of FIGURE 8, FIGURE 10 shows an end view in elevation of the structure of FIGURES 8 and 9, FIGURE 11 shows a plan view, partly in section, of the vertical brake and adjusting means for the apparatus of FIGURE 1, FIGURE 12 shows a cross-sectional view taken along line 12—12 of FIGURE 11, FIGURE 13 shows a perspective view, partly in section, of the structure shown by FIGURES 11 and 12, FIGURE 14 shows an enlarged side elevation, partly in section, of a portion of the apparatus of FIGURE 1, with the rotary cutter replaced by a flange folding wheel, and FIGURE 15 shows a general view of the supporting structure between the table and upper box frame members of FIGURE 1.

With reference to the drawings described above, and particularly to FIGURE 1, the apparatus disclosed herein includes arcuate severance means which may take the form of a rotary cutter 10 mounted in close proximity to one edge of a table support 12, by means of which an element such as a sheet of metal as indicated by reference numeral 2 may be supported. Clamping means including upper clamping element 14 and lower clamping element 16 are provided so that sheet 2 may be further supported and securely held with a portion thereof overhanging an elongate severance means such as straight bar knife 18. Rotary cutter 10 is driven by a driving shaft including an internally splined portion 19 which is journalled in a bearing housing 20, and an externally splined portion 17 which is rotatably driven through separable coupling 106 as shown in FIGURE 3. Bearing housing 20 is affixed to a housing support member 22 as shown in FIGURE 5. Member 22 has a channel 21 cut in the top surface thereof with undercut channel walls 24 on each side of channel 21, by means of which member 22 is suspended from a slidable element in the form of roller support 32 having beveled sliding surfaces 38, 40 on either side at the lower edges thereof. As shown in FIGURE 5, undercut channel walls 24 of member 22 contact beveled surfaces 38 and 40 and are in sliding engagement therewith. Roller support 32 is in turn suspended from a member 42 which has underhanging tracks 48 and 50. The upper surfaces of these tracks are in sliding contact with the lower surfaces of two overhanging tracks 44 and 46 located on either side of roller support 32. Upward force is exerted on housing support 22 by four springs attached to member 42 and denoted by reference numeral 56 in FIGURE 5 which counteract the downward force of housing support 22. Springs 56 thus considerably reduce or eliminate the friction which would otherwise be exerted between undercut channel walls 24 and beveled sliding surfaces 38 and 40.

With reference to FIGURE 9, roller support 32 may be seen to function as the main support for two followers or rollers 26 and 28 rotatably mounted by pivots 29 and 30, respectively. Rollers 26 and 28 are constantly maintained in rolling contact with surface 25 of cam track 23 as shown in FIGURE 3. Roller support 32 also contains a guide slot 34 in which guide pin 36 is slidably movable as shown by FIGURE 8. Roller support 32 also includes a flange 33 on which a spring guide 35 is integrally formed. Spring guide 35 is contained within a heavy duty spring 70 shown in FIGURE 3, one end of which bears on flange 33 and the other against a bearing plate 72. The force exerted by spring 70 on flange 33 may be varied by turning adjusting screw 74 which is rotatably journalled in threaded engagement with boss 76 and equipped with hexagonal head 78 to permit rotation of the adjusting screw.

Thus it may be seen that roller support 32 is slidably supported within suspension member 42 to permit movement toward the left or right as shown in FIGURE 3, and is urged toward the left by the force of spring 70. The relative position of roller support 32 with respect to member 42 is determined by the contour of surface 25 on cam track 23, upon which rollers 26 and 28 move in continuous contact. Housing support 22 is slidably mounted on roller support 32. The relative position of housing support 22 with respect to roller support 32 is determined by the position of handle 58 shown in FIGURES 1 and 3. Handle 58 is mounted at one end of shaft 60, the other end of which is provided with threads 62. Threaded end 62 of shaft 60 is threadedly engaged in a hole (not shown) in the right-hand end of housing support 22 as drawn in FIGURE 3. A gage 68 is mounted on flange 33 of roller support 32 by means of hole 66 shown in FIGURE 9, this gage being provided with an indicator rod 64, the end of which bears against the right-hand end of housing support 22 as shown in FIGURE 3. When handwheel 58 is rotated, housing support 22 is moved to the left or right with respect to roller support 32, this change in relative position causing corresponding movement of indicator rod 64, the extent and direction of which is indicated by gage 68.

Lateral adjustment of rotary cutter 10 with respect to bar knife 18 is thus accomplished by means of handwheel 58, the rotation of which causes leftward or rightward movement of housing support 22 and hence of cutter 10. After the position of rotary cutter 10 has been adjusted by the stated means, this position may be continuously maintained by means of a brake provided for this purpose. This brake comprises a wedge 84 shown in FIGURE 5, this wedge being contacted by a threaded shaft 82 threadedly engaged in a hole within housing support 22. Shaft 82 may be rotated by means of handle 80 provided for this purpose. Rotation of shaft 82 causes force to be applied toward the right in FIGURE 5 so that wedge 84 bears with increasing force on beveled sliding surface 40, and the reaction from this force pulls undercut channel wall 24 more closely against opposite beveled sliding surface 38, securely clamping housing support 22 tightly against roller support 32, and preventing relative movement therebetween while the brake is engaged.

As shown by FIGURE 3, suspension member 42 is affixed to a vertically adjustable support 90. Support 90 includes a slide plate 91 at one side thereof, this plate contacting and slidably engaging a slide block 92. Block 92 is fixedly mounted on carriage frame 100, which moves neither laterally nor vertically as seen from FIGURE 3, but is capable of translational movement toward the right or left with respect to table 12 as seen in FIGURE 2.

Vertical adjustment of rotary cutter 10 with respect to table 12 is manually accomplished by handwheel 124 shown in FIGURES 2 and 3. Handwheel 124 is mounted on a shaft 125 which is rotatably journalled within a housing 126. Shaft 125 is provided with a bevel gear 128 which is rotated by turning handwheel 124. Gear 128 is operatively engaged with bevel gear 132 mounted atop a threaded shaft 134. Shaft 134 is pivoted between bearing mounts 136 and 138, and is prevented from vertical movement relative to adjustable support 90 by means of retainer ring 142 and flange 143 contacting the upper and lower surfaces of bearing 138, respectively. Shaft 134 is threadedly engaged within a relatively immovable nut 144, so that rotation of shaft 134 by means of handwheel 124 causes vertical movement of shaft 134, adjustable support 90 and slide plate 91. Since nut 144 is fixedly attached to slide block 92 which forms part of vertically immovable frame 100, slot 146 in plate 91 is provided as shown in FIGURES 11–13, in order to permit relative movement between the stated nut and plate.

A brake generally corresponding to that for holding rotary cutter 10 in a relatively fixed lateral position with respect to table 12 is also provided to secure cutter 10 against changes in vertical position after vertical adjustment has been completed. As shown by FIGURE 3, handle 108 is provided at one end of the rotatable shaft 112 which is supported within a steady mount 114. Threaded end 116 of shaft 112 is operatively engaged by corresponding threads within an opening in wedge or brake 118 as may be seen from FIGURES 11 and 13. A beveled braking surface 122 forms one wall of a slot 123 which is provided in slide block 92, so that wedge 118 moves vertically in the stated slot when rotation of threaded shaft 134 causes vertical movement of slide plate 91 and related structure.

Thus, it may be seen that rotation of shaft 112 by means of handle 108 causes movement of wedge 118 either toward or away from beveled surface 122. After the vertical position of rotary cutter 10 with respect to table 12 has been adjusted by handwheel 124 in the manner set forth above, vertical brake handle 108 may be operated to cause movement of wedge or brake 118 into close contact with surface 122, securely holding slide plate 91 against slide block 92 and preventing relative movement therebetween.

As shown by FIGURE 1, rotary cutter 10 and all its adjustment and supporting means described above are mounted on carriage frame 100. Carriage frame 100 is movably guided and supported by means in the form of upper and lower guide rails 130 and 150, respectively, and gear rack 140, so that the stated frame is linearly movable with respect to stationary main frame 120. This relative movement may be caused by manual means or by suitable mechanical devices, and in the preferred embodiment is accomplished by a constant speed electric motor 160 shown in FIGURE 2, acting on main driving sprocket 156 through variable speed transmission 152 and gear box 154, all of which are mounted on vertically immovable upper carriage frame 110 as shown in FIGURE 1.

Main driving sprocket 156 in turn drives sprocket 162 by means of chain 158, as best seen in FIGURE 1. Sprocket 162 rotates segmented shaft 164, on the left end of which a pinion 148 is affixed. Pinion 148 is mounted with its gear teeth interengaged with those on gear rack 140 so that rotation of the stated pinion causes translational movement of shaft 164, and hence of frame 100 in which the stated shaft is rotatably journalled.

The right end of segmented shaft 164 is provided with a sprocket 94 rotatably mounted within housing 96 as shown in FIGURE 1. Sprocket 94 drives sprocket 102 by means of chain 98. Sprocket 102 is rotatably mounted within a housing 104 which is affixed at the lower end of vertically adjustable support 90. Housing 96 is also affixed to support 90 at its upper end as shown in FIGURE 1, so that vertical movement of the stated vertically adjustable support 90 by means of handwheel 124 in the manner set forth above will produce corresponding vertical movement of housings 96 and 104 and sprockets 94 and 102 respectively mounted therein. Since the righthand end of segmented shaft 164 is pivotally mounted within structure affixed to carriage frame 100 which is not vertically movable, an intermediate portion of segmented link 164 is provided with universal joints at either end of the stated portion, so that a driving connection between sprockets 162 and 94 will be continuously maintained while relative vertical movement between the stated two sprockets is also permitted.

Means are also provided in the form of tension adjusting screw 178 shown in FIGURE 2, for example, for adjusting the tension in chain 98. As shown in the stated figure, screw 178 is rotatably journalled and threadedly engaged in a lower boss 176 with the upper end of the stated screw contacting an upper boss 182 integrally formed on plate 183. Plate 183 is attached to vertically adjustable support 90 by means of four bolts 184 which pass through slots 186 and plate 183. With bolts 184 in the loosened condition, tension in chain 98 may be increased by rotation of tension adjusting screw 178 causing upward movement of the stated screw by reason of its threaded engagement with relatively stationary lower boss 176. Upward movement of screw 178 causes corresponding movement of upper boss 182 and plate 183. This movement is permitted by slots 186, and when the desired tension in chain 98 is achieved, bolts 184 may be tightened down to hold plate 183 securely against vertically adjustable frame 90 and prevent relative movement therebetween.

Since operation of motor 160 causes rotation of segmented shaft 164, together with pinion 148 and sprocket 94 mounted in the left and right end of the stated shaft, respectively, as seen in FIGURE 1, translational movement of frame 100 and rotation of rotary cutter 10 both occur simultaneously. Means for varying the speed of this translational and rotational movement are provided in the form of handwheel 187 which acts through flexible cable 188 to vary the speed output of variable speed transmission 152.

As seen from FIGURES 6 and 7, box beam 190 is mounted atop the main frame 120 by means of upright flange 220 passing between yoke members 226 and operatively joined thereto by means of pivot pin 228. Each end of box beam 190 is mounted on frame 120 in the stated manner, while frame 120 is fixedly mounted on table 12 by suitable brackets or braces such as hollow columns 290 shown in FIGURE 15. Means are provided for applying downward clamping force on clamp member 14, the stated means comprising a plurality of pneumatic or hydraulic cylinders 192, each of which applies force to a push rod 196 through a piston rod 194 in contact therewith. Push rods 196 apply downward force to upper clamp member 14 when cylinders 192 are pressurized. An annular flange at the upper end of each push rod 196 contacts a compression spring 198 as shown in FIGURE 1, so that upward force from the stated springs cause upward movement of push rods 196 when pressure is released from cylinders 192.

Upward movement of push rods 196 permits upper clamp member 14 to be raised. Means for raising member 14 are provided in the form of one or more brackets 202 attached to stationary main frame 120, to each of which a pneumatic or hydraulic jack 204 is pivotally secured as shown in FIGURE 1. A piston rod 206 operatively connected within each cylinder 204 is pivotally joined to a rocking lever 208 which is pivotally mounted on main frame 120 by means of pivot pin 210. On the end of each rocking lever 208 opposite from the point of attachment of piston rod 206 a pull rod 212 is also pivotally attached. The lower end of each pull rod 212 is pivotally attached to an intermediate link 214 in the manner shown by FIGURE 1, the stated link being further pivotally attached to bracket 216 on upper clamping member 14. When cylinder 204 is pressurized causing downward movement of piston rod 206 and corresponding upward movement of pull rod 212, intermediate link 214 applies upward force on bracket 216 and upper clamping member 14, raising the clamping member and thus freeing the workpiece upon which downward clamping force was formerly applied. A guiding link 218 is also pivotally connected to bracket 216 in the manner shown by FIGURE 1 to insure that upper clamping member 14 will be raised a uniform vertical distance throughout its width and length. Upward movement of pull rod 212 also causes actuation of a microswitch 224 due to operative engagement of actuating arm 222 of the microswitch with the top end of pull rod 212 as best seen from FIGURE 1. By appropriate electrical connections (not shown) in the control circuit for cylinders 192, actuation of microswitch 224 due to upward movement of pull rod 212 and clamping member 14 may be caused to prevent actuation of cylinders 192 so that downward force may not be applied on the stated clamp member in opposition to the lifting force applied by pull rods 212.

Operation

Although the apparatus disclosed herein may be used to achieve dimensional accuracy in a variety of diverse materials and shapes, its operation will not differ materially from the description set forth below in connection with trimming the edge of thin metal sheets such as sheet 2 shown, for example, in FIGURE 3. Operation of the edge preparation machine may be commenced by actuating cylinders 192 and 204 to raise push rods 196 and pull rods 212, respectively. This action raises upper clamp member 14, permitting sheet 2 to be laid on the top surface of table 12 under clamp member 14 with the edge of sheet 2 overhanging bar knife 8 in the amount desired to be trimmed off.

Prior to the actual trimming operation, rotary cutter 10 is positioned with respect to bar knife 18 to produce the desired characteristics in the trimmed edge. Selection of the stated position will depend upon the type and thickness of material being trimmed, but in no case is contact permitted between the edges of rotary cutter 10 and bar knife 18. Since the stated edges merely impose loads on the workpiece to cause a rupture due to shear failure therein, and do not slice completely through the material of the workpiece, the surfaces of the stated cutter and knife do not scrape past each other in the manner of scissor blades, for example. Moreover, since the surfaces of rotary cutter 10 forming edge 11 are metallurgically treated to produce maximum hardness, and bar knife 18 is similarly surface hardened, actual contact between the two stated surfaces would tend to produce excessive wear and unevenness, hence is carefully avoided.

From FIGURE 4, it may be seen that rotary cutter 10 is provided with an annular edge 11 formed by the intersection of plane surface 4 and cylindrical surface 6. Plane surfaces 7 and 8 of knife 18 intersect to form a straight edge which cooperates with edge 11 to sever material lying between the two stated edges. Both of the stated edges are precision made to form perfect 90° angles. The lateral distance between surface 4 of cutter 10 and surface 8 of knife 18 may be adjusted by means of handwheel 58 so that each of the two stated surfaces approaches but does not enter the plane occupied by the other. Thus, with the distal end of a sheet 2 overhanging bar knife 18 in the manner shown by FIGURE 4, the load imposed by cutter 10 on sheet 2 is closer to the distal end thereof than the reaction load imposed by knife 18. For optimum results, the lateral distance between surfaces 4 and 8 should in no case exceed an amount equivalent to one-third of the thickness of material being trimmed. The lateral clearance between the edge 11 and surface 8 of bar knife 18 is readable on gage 68 as set forth above and is securely maintained after initial adjustment by rotation of handle 80 to engage brake member 84 in forcible contact with beveled surface 40.

Vertical adjustment of rotary cutter 10 with respect to bar knife 18 is accomplished by rotation of handwheel 124 which causes vertical movement of adjustable support 90 and all structure attached thereto including sprocket housings 96 and 104, suspension member 42, roller support 32, housing support 22 and bearing housing 20. Edge 11 of cutter 10 may thus be vertically positioned so that a line parallel to the edge of knife 18 and tangent to cylindrical surface 6 at the lowermost point thereof will lie vertically above the edge of knife 18 by a distance, the amount of which depends primarily upon the thickness and shear strength of the material being trimmed. Since the surfaces 6 and 7 of cutter 10 and blade 18, respectively, apply loads which cause rupture of the material therebetween due to failure in shear, the lowermost linear segment of surface 6 need not be on precisely the same level as surface 7 of bar knife 18. When the desired vertical position has been established, the rotation of handle 108 operates vertical brake 118 to maintain the stated relationship between rotary cutter 10 and bar knife 18 throughout the trimming operation.

After cutter 10 is adjusted in the desired relationship to bar knife 18, and sheet 2 is placed on table 12 with the desired amount of overhang, cylinders 192 may be actuated to apply downward force on upper clamping member 14 securely clamping the stated sheet material in the desired position. Motor 160 is then operated to produce rotation of pinion 148 at a speed determined by the position of variable speed transmission control handle 187. Simultaneously with the rotation of pinion 148 and commensurate with the speed thereof, rotary cutter 10 is also rotated by operation of motor 160. Rotation of pinion 148 while operatively engaged with gear rack 140 causes translational movement of carriage frame 100 toward the left or toward the right as shown in FIGURE 2 depending upon the direction of operation of reversible motor 160. When carriage frame 100 and rotary cutter 10 are moved laterally, the portion of sheet 2 overhanging the cutting edge of bar knife 18 is severed with equal accuracy regardless of whether the direction of movement is toward the right or the left as viewed in FIGURE 2.

Severance occurs by reason of the load progressively applied by surface 6 upon the upper surface of the workpiece during translation and rotation of cutter 10, such load being reacted by surface 7 of bar knife 18. It may be seen from FIGURE 4 that the areas upon which opposing forces are applied by the stated surfaces to sever a portion of the workpiece are in close juxtaposition but never precisely in contact with each other. This results from the minute but definite lateral distance between the vertical planes defined by surfaces 4 and 8 of cutter 10 and knife 18, respectively. Thus, the area in which the shear load is imposed by cutter 10 is laterally displaced from the area in which the reaction force from such load is imposed by bar knife 18. Rupture of the material of the workpiece occurs when the material fails in shear in a plane of severance indicated by the broken line in FIGURE 4 lying between the closest boundaries of the two stated areas. It is characteristic of the action thus described that the resulting edge on the trimmed workpiece, lying in the plane of severance, is cleanly cut, uniformly straight, and completely free of burrs, bends or waves, such as commonly are associated with the tearing or cutting action of saws or scraping blades.

During lateral movement of frame 100 and cutter 10, the entire vertical load from the full weight of frame 100 and structure supported thereon is concentrated between main load support flange 167 and main load support track 172. Track 172 is secured to adjacent structure forming part of main frame 120 by means of a segmented key 173. The lower portion of the member forming track 172 forms a downwardly projecting lower guide rail 150. Guide rail 150 is engaged in sliding contact on either side thereof by portions of carriage frame 100 including upwardly projecting flange 174, so that lateral movement of the lower end of frame 100 as seen from FIGURE 1, for example, is restrained by rail 150. Restraint against lateral movement at the upper end of frame 100 is exerted by upper guide rail 130 and flange 166 in a manner similar to that described in connection with lower guide rail 150 and flange 174. Thus, it may be seen that frame 100 and structure attached thereto is entirely supported by track 172 insofar as vertical load is concerned, while movement along the stated track caused by operation of pinion 148 engaging gear rack 140 is guided by upper and lower guide rails 130 and 150, respectviely.

Continuous accurate lateral stability of rotary cutter 10 with respect to bar knife 18 throughout the distance traversed by carriage frame 100 and structure supported thereon is maintained by means other than those described above for guiding and stabilizing the translational movement of frame 100. Lateral movement of rotary cutter 10 with respect to bar knife 18 is controlled by means which are structurally isolated and independently operable from the remainder of the supporting structure. From the structure described above and disclosed in the drawings, it may be seen that the lateral position of cutter 10 as viewed in FIGURE 1, for example, depends entirely upon the lateral position of cam rollers 26 and 28. This results from the fact that rotary cutter 10 is secured to a drive shaft 19 laterally immovable within bearing housing 20 which is clamped in constant relationship to member 32 upon which cam rollers 26 and 28 are mounted. Thus, if cam rollers 26 and 28 could move to the right causing corresponding movement of member 32 against the force of spring 70 while wedge 84 is holding bearing housing 20 in constant relationship with member 32, the stated housing and rotary cutter 10 would necessarily move toward the right the same amount as rollers 26 and 28. The lateral position of rollers 26 and 28 is controlled throughout the translational movement of the said rollers by the contour of surface 25 of cam track 23 as shown, for example, in FIGURE 3. The outer surfaces of cam rollers 26 and 28 and surface 25 are metallurgically treated to produce maximum hardness. Moreover, the stated rollers are precision made to provide accurate roundness, while surface 25 is accurately formed to produce a smooth, straight reference plane of utmost precision. Spring 70 functions to apply tremendous force upon roller support 32 which transmits this force to hold cam rollers 26 and 28 securely against surface 25 at all times. Accordingly, the precise lateral relationship between rotary cutter 10 and bar knife 18, as initially established by lateral adjustment control handle 58, indicated by gage 68, and securely held by brake means 40, 80, 82 and 84, is continuously maintained by the straight and undeviating line of movement traversed by cam rollers 26 and 28 during their contact with cam track surface 25. Moreover, any jarring movement or lateral inaccuracy in the path of travel of carriage frame 100 and structure affixed thereto will not produce any variations in the path traversed by rotary cutter 10 during the edge trimming operation due to the arrangement of parts described above.

Accuracy in the cutting action between rotary cutter 10 and bar knife 18 is further preserved in the apparatus described above by certain unique features of the means for applying clamping force on sheet 2. Tremendous downward force may be applied on clamping member 14, depending upon the size, number, and working pressure of cylinders 192 used in applying such force. Since the stated force may exceed 25,000 pounds, means are required to prevent the reaction load of this force from causing deflection of main frame 120, guide rails 130, 150 and cam track 23, in such a manner as would produce damaging effects upon the accuracy and freedom of movement of carriage frame 100 and rotary cutter 10.

Means for avoiding deflection of the stated type are provided in the form of box beam 190 shown in cross-section in FIGURE 1 mounted on main frame 120 in the manner shown by FIGURES 6 and 7. As noted above, cylinders 192 in which the downward clamping force of member 14 originates, are mounted on box beam 190. Therefore, the reaction from this force is applied to box beam 190 in an upward direction. Since the stated beam is restrained by pins 228 at each end thereof, the beam ends cannot move upwardly. Therefore, when cylinders 192 are pressurized, beam 190 bows upwardly with its greatest deflection at the center point midway between the two pins 228, altering the position of the beam centerline in the manner indicated by angle A shown in FIGURE 6. Since the ends of beam 190 are pivoted on brackets 220 in the manner stated, no vertical force is transmitted through these brackets by the reaction loads applied to the beam. The forces transmitted from brackets 220 to main frame 120 are concentrated in an area and in a direction in which frame 120 offers the greatest resistance and consequently the least deflection. Thus, for example, equal vertical loads applied at either end of main frame 120 by brackets 220, whether such loads be upwardly or downwardly directed, would have no effect on the level condition of the racks, tracks, or rails upon which accuracy and freedom of movement of carriage frame 100 depends. Also, forces in tension or compression applied between the ends of main frame 120 would not cause upward or downward deflection of the stated frame at any intermediate point between such ends. Therefore, it may be seen from the above description and related drawings that accuracy of the cutting action between rotary cutter 10 and bar knife 18 is unaffected by the reaction forces resulting from the clamping action of members 14 and 16.

Means are further provided to preserve the stated accuracy and facilitate the adjustment of the relative position between rotary cutter 10 and bar knife 18. As noted in the descriptive material set forth above and shown in FIGURE 5, a sliding fit occurs between beveled sliding surfaces 38 and 40 on roller support 32 and undercut channel walls 24 on housing support 22. To permit this type of fit, a certain small amount of looseness between the sliding parts is required. In the stated structure, this looseness permits relative movement between housing support 22 and roller support 32 during adjustment of the lateral position of rotary cutter 10 by means of handwheel 58. However, when lateral brake handle 80 is rotated to snug wedge 84 tightly against beveled surface 40 after rotary cutter 10 has been adjusted in the desired position, the started looseness between the sliding parts is necessarily eliminated. This action would normally alter the lateral position of rotary cutter 10 because the camming action of wedge 84 while being moved into operative engagement with surface 40 moves housing support 22 upwardly at its left or right end as viewed in FIGURE 3. To eliminate this effect, four springs 56 are mounted in the manner described above to exert compressive force between suspension member 42 and housing support 22 so that support 22 is always held snugly against the bottom surface of roller support 32 regardless of whether wedge 84 is loosened or tightened with respect to surface 40. By means of the stated arrangement of parts, no downward sagging at either end of housing support 22 occurs from the looseness of the sliding fit described above when the lateral brake means 80, 82, 84 is operated to release the brake. Thus the lateral position of rotary cutter 10 as initially adjusted by handwheel 58 and indicated by gage 68 is not altered as a result of actuating lateral brake handle 80 to clamp housing support 22 in constant relationship with roller support 32.

In addition to the above uses and results, the edge preparation apparatus disclosed herein may be used to fold accurately a portion of the trim edge of the workpiece 2 to prepare the same for welding to another similar workpiece. This is accomplished after the above described trimming operation by raising upper clamp element 14 in the manner described above, permitting movement of sheet 2 so that the trimmed edge may be projected over the cutting edge of bar knife 18 to establish an overhang in the amount desired to be folded. Rotary cutter 10 is removed from the end of drive shaft 19 and replaced by arcuate means in the form of a flange folding wheel 230 shown in FIGURE 14. Lateral and vertical adjustment of the relative position between wheel 230 and bar knife 18 may be accomplished by means of handwheels 58 and 124 in the manner set forth above in connection with adjustment of rotary cutter 10. The apparatus is then operated in a manner generally similar to that described above for use with cutter 10, causing wheel 230 to rotate and also move translationally along a path parallel and closely adjacent to bar knife 18. Instead of severing a portion of sheet 2 as accomplished by cutter 10, wheel 230 merely bends the overhanging portion of sheet 2 downward over the cutting edge of knife 18, forming a perfect 90° bend along the edge portion of the workpiece.

Thus, it may be seen that the apparatus disclosed herein may be used for trimming edges of great length on sheets of extreme thinness, to provide a perfectly straight, precision cut, burrless edge. The present invention has been found to provide perfect accuracy in shaving as little as .005 inch from high temperature advanced alloy steel foil .006 inch thick and sixteen feet wide, with no burrs, bends, or folds on the finished edge. Moreover, since cylinders 192 may be used selectively and pressurized in any desired amount to vary the distribution of the clamping force applied by upper clamp member 14, this invention achieves the stated accuracy and results even with materials of tapered or otherwise non-uniform thickness, or with material from which a tapered strip must be removed. In addition, this invention achieves a considerable economic advantage over all other known machine shop techniques for achieving the results and objectives set forth above.

While the particular structural details set forth above and in the drawings are fully capable of attaining the objects and providing the advantages herein stated, the structure thus disclosed is merely illustrative and could be varied or modified to produce the same results without departing from the scope of the inventive concept as defined in the appended claims.

We claim:
1. In apparatus for trimming a workpiece by severing a portion therefrom;
   support means for supporting the workpiece during trimming thereof,
   movable severance means movable along a predetermined path for progressively applying a shear load on an area of said workpiece surface contacted by said movable severance means, and
   stationary severance means for imposing the reaction load from said shear load on an area of said workpiece surface laterally displaced from an in close juxtaposition to said area of shear load, so that said workpiece fails in shear in a plane of severance parallel to said path, intermediate the boundaries of said areas of shear and reaction loads, and substantially perpendicular to said surfaces upon which both said loads are applied.

2. The apparatus set forth in claim 1 above, including in addition thereto;
 adjusting means for varying the amount of vertical distance between said movable severance means and said stationary severance means.

3. The apparatus set forth in claim 1 above, wherein: said movable severance means includes an arcuate member movable with respect to said stationary severance means, and said stationary severance means includes an elongate knife edge.

4. The apparatus set forth in claim 3 above, wherein: said arcuate member comprises a wheel, the periphery of which is provided with a precision made edge comprising the apex of a perfect 90° angle, and said knife edge comprises the apex of a perfect 90° angle.

5. The apparatus set forth in claim 1 above, including in addition thereto:
 clamping means for holding said workpiece stationary during trimming thereof,
 said clamping means including a stationary lower element,
 an upper element movable with respect to said lower element either to release said workpiece or to hold said workpiece securely and prevent movement thereof, and
 means for moving said upper element.

6. The apparatus set forth in claim 1 above, including in addition thereto:
 adjusting means for varying the amount of lateral displacement between the area contracted by said movable severance means and the area contacted by said stationary severance means.

7. The apparatus set forth in claim 6 above, including in addition thereto:
 releasable holding means for holding said movable severance means in a position of adjustment established by said adjusting means.

8. The apparatus set forth in claim 1 above, including in addition thereto:
 frame means mounted on said support means, elongate support means forming part of said frame means,
 carriage means supported by said elongate support means and movable translationally with respect to said frame means, and
 connection means connecting said movable severance means to said carriage means so that translational movement of said carriage means causes similar movement of said movable severance means,
 said connection means including laterally slidable means for permitting independent lateral movement of said movable severance means relative to said carriage means.

9. The apparatus set forth in claim 8 above, including in addition thereto, means operatively interengaging said carriage means and said frame means to cause translational movement of said carriage means with respect to said frame means.

10. The apparatus set forth in claim 8 above, wherein: said elongate support means includes a plurality of guide rails in parallel and spaced relationship, each said guide rail being operatively engaged with said carriage means so that during translational movement of said carriage means, lateral movement of said carriage means is restrained in a direction substantially perpendicular to the direction of said translation movement,
 said apparatus further including cam means on said frame means,
 roller means in contact with said cam means, said roller means being operatively related to said laterally slidable means for controlling said independent lateral movement of said movable severance means in accordance with the contour of said cam means.

11. The apparatus set forth in claim 8 above, including in addition thereto:
 driving means for simultaneously moving said carriage means translationally with respect to said frame means and moving said movable severance means rotationally,
 motor means connected to said driving means for driving same,
 said driving means for moving said carriage means including a pinion engaged with a gear rack,
 said driving means for moving said movable severance means rotationally including a chain and a plurality of sprockets,
 means for varying the tension of said chain while said chain is operatively engaged with said sprockets.

12. Apparatus for trimming a workpiece by severing a portion therefrom including:
 support means for supporting said workpiece during trimming thereof,
 stationary elongate severance means mounted on said support means,
 arcuate severance means movable with respect to said elongate severance means and cooperating therewith so that a portion of said workpiece is severed by movement of said arcuate severance means to trim said workpiece,
 adjustable clamping means mounted on said support means for holding said workpiece stationary during said trimming operation,
 frame means mounted on said support means, elongate support means forming part of said frame means,
 carriage means supported by said elongate support means and movable translationally with respect to said frame means,
 connection means connecting said arcuate severance means to said carriage means,
 means operatively interengaging said carriage means and said frame means to cause translational movement of said carriage means,
 stationary reference means mounted on said frame for controlling the path of translational movement of a follower in contact with said reference means,
 said connection means including a slidable element laterally movable substantially perpendicularly to said translational movement,
 a follower mounted on said slidable element, said arcuate severance means being secured to said slidable element so that lateral movement of said arcuate severance means is controlled by lateral movement of said follower.

13. The apparatus set forth in claim 8 above including in addition thereto:
 means for applying force to maintain contact between said follower and said stationary reference means.

14. Apparatus for trimming a workpiece by severing a portion therefrom, including:
 support means for supporting said workpiece during trimming thereof,
 stationary elongate severance means mounted on said support means,
 arcuate severance means movable with respect to said elongate severance means and cooperating therewith,
 adjustable clamp means mounted on said support means for holding said workpiece stationary,
 said clamp means including a stationary lower element and an upper element movable either to release said workpiece or to hold said workpiece stationary,
 means to move said upper element including cylinder means for applying clamping force to said upper element,
 frame means mounted on said support means, elongate support means forming part of said frame means, carriage means supported by said elongate support means and movable translationally with respect to said frame means, connection means connecting said arcuate severance means to said carriage means so that translational movement of said carriage means causes similar movement of said arcuate severance means, and mounting means on said frame means for mounting said cylinder means and reacting against the clamping force applied to said workpiece by said clamping means, said mounting means including a beam pivotally mounted on said frame means by a pivot mount at each end of said beam.

15. In shearing apparatus for trimming a metallic workpiece in sheet form by securing said workpiece with a portion thereof overhanging an elongate stationary knife and moving an arcuate knife relative to said stationary knife to sever said overhanging portion:

frame means comprising a stationary support, carriage means supported on said frame means for translational movement relative thereto, drive means for causing said translational movement, bearing means for rotationally supporting said arcuate knife, mounting means operatively related between said carriage means and said bearing means for permitting independent lateral movement of said bearing means and said arcuate knife relative to said carriage means transverse to the direction of said translational movement, cam means supported upon said frame means, and cam follower means on said mounting means operatively related to said cam means for continuously controlling said independent lateral movement during said translational movement.

16. The structure set forth in claim 15 above wherein:

said mounting means comprises a support member slidably mounted for independent lateral movement between a plurality of tracks secured to said carriage means, said bearing means being releasably secured to said support member, and said cam follower means including at least one roller pivotally mounted on said support member.

17. Shearing apparatus for trimming a metal sheet, said apparatus comprising:

a table for supporting said metal sheet, an elongate knife mounted on one side of said table, clamp means for holding said sheet on said table with a portion of said sheet overhanging said elongate knife, an arcuate knife operatively related to said elongate knife, a main frame affixed to said table and in space relationship therewith, a pair of spaced-apart guide rails mounted on said main frame with one said guide rail mounted parallel to and above the other said guide rail, a carriage frame supported on said pair of guide rails and translationally movable with respect thereto, a drive motor mounted on said carriage frame and translationally movable therewith relative to said guide rails, a rack mounted on said main frame generally parallel to said pair of guide rails, a pinion mounted on said carriage frame for rotation relative to said carriage frame, said pinion operatively engaging said rack, first driving connection means between said drive motor and said pinion, lower support means secured to said carriage frame, a suspension member affixed to said lower support means, a roller support slidably mounted on said suspension member and laterally movable with respect thereto, a housing support slidably mounted on said roller support and laterally movable with respect thereto, a bearing housing for supporting said arcuate knife for rotation of said arcuate knife relative to said bearing housing, a cam track mounted on said main frame, a roller pivotally mounted on said roller support and operatively contacting said cam track for controlling said lateral movement of said roller support, force means mounted on said lower support means for applying continuous force to said roller support to maintain said operative contact of said roller with said cam track, and second driving connection means between said drive motor and said arcuate knife, said first and second driving means causing simultaneous translational movement of said carriage frame along said guide rails and rotational movement of said arcuate knife.

18. In shearing apparatus for trimming metallic workpieces in sheet form by securing said workpiece with a portion thereof overhanging an elongate stationary knife element and moving an arcuate knife element relative to said stationary knife element to sever said overhanging portion:

frame means comprising a stationary support, carriage means supported on said frame means for translational movement relative thereto, drive means for causing said translational movement, lower support means secured to said carriage frame, a suspension member affixed to said lower support means, a roller support slidably mounted on said suspension member and laterally movable with respect thereto, bearing support means releasably secured to said roller support and adjustably movable laterally with respect thereto, said arcuate knife element being rotationally mounted on said bearing support means, cam means mounted on said frame means, and cam follower means mounted on said roller support and operatively engaging said cam means during said translational movement of said carriage means whereby said lateral movement of said roller support is controlled by said cam means during said translational movement.

19. The structure set forth in claim 18 including in addition thereto:

adjusting means for adjustably varying the position of said bearing support means relative to said roller support, and holding means for releasably holding said position constant after said adjustment of said bearing support means relative to said roller support.

20. The structure set forth in claim 18 above wherein:

said lower support means is secured to said carriage frame by releasable connection means whereby the position of said lower support means relative to said carriage frame may be adjustably varied to move said arcuate knife element closer to and farther from said elongate stationary knife element.

21. In apparatus for trimming a metallic workpiece by severing a portion from said workpiece:

support means for supporting said workpiece, a stationary clamping element secured to said support means, a movable clamping element operatively related to said stationary clamping element for releasably holding said workpiece stationary on said support means during said severing operation, cylinder means including at least one cylinder for applying clamping force to said movable clamping element to compress said workpiece between said movable and said stationary clamping elements, an elongate force-reacting element for supporting said cylinder and reacting against said clamping force, frame means for supporting said elongate force-reacting element on said support means, and pivotal connection means on said frame means for pivotally supporting said elongate force-reacting element at each end thereof.

22. Shearing apparatus for trimming a workpiece in sheet form, said apparatus comprising:

a table for supporting said sheet, an elongate knife element mounted on said table, an arcuate knife element operatively related to said elongate knife element, a main frame affixed to said table, guide rail means mounted on said main frame, a carriage frame supported on said guide rail means and translationally movable with respect thereto, drive means for causing said translational movement, bearing means for rotationally supporting said arcuate knife element on said carriage frame, a first clamping element secured to said table, a second clamping element movably mounted on said main frame and operatively related to said first clamping element, force means including at least one fluid operated cylinder for applying clamping force to said second clamping element to hold said sheet stationary between said first and second clamping element, a beam for supporting said fluid operated cylinder and reacting against said clamping force, and pivotal connection means including a single axis pivot pin on said frame means supporting said beam at each end thereof whereby deflection of said beam under said reaction transmits only pure tensile loads to said frame through said pivot pin.

23. The method of trimming a workpiece by the steps of:

placing said workpiece on a support with an edge of said workpiece slightly overhanging a stationary straight edge, clamping said workpiece on said support in the stated relationship, moving a surface translationally along a path parallel to and in close proximity to said straight edge to impose a load progressively on the overhanging portion of said workpiece so that said workpiece fails in shear in a plane intermediate the areas of said workpiece contacted by the surfaces of said straight edge and said translationally moving surface.

References Cited in the file of this patent

UNITED STATES PATENTS

| | | |
|---|---|---|
| 9,978 | Ruggles | Aug. 30, 1853 |
| 16,334 | Hardy | Jan. 6, 1857 |
| 40,034 | Hardy | Sept. 22, 1863 |
| 1,812,406 | Jenkins | June 30, 1931 |
| 2,152,165 | Wilson | Mar. 28, 1939 |
| 2,384,284 | Dettman | Sept. 4, 1945 |
| 2,594,819 | Stenson et al. | Aug. 29, 1952 |
| 2,854,733 | Smith | Oct. 7, 1958 |